United States Patent
Ghai et al.

(12) 
(10) Patent No.: US 6,389,024 B1
(45) Date of Patent: May 14, 2002

(54) FLEXIBLE CALL ROUTING SYSTEM

(75) Inventors: Rajat Ghai, West Yarmouth; Mark P. Hebert, Kingston; Michael Silva, South Dartmouth, all of MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/093,554

(22) Filed: Jun. 8, 1998

(51) Int. Cl.[7] .............................................. H04L 12/56
(52) U.S. Cl. .................................. 370/395.31; 370/410
(58) Field of Search ................................ 370/252, 253, 370/254, 255, 389, 392, 400, 401, 402, 403, 404, 405, 406, 408, 409, 428, 429, 398, 395.3, 395.31, 395.32, 410; 709/238, 239, 240, 242, 243, 244, 249, 250

(56) References Cited

U.S. PATENT DOCUMENTS

| | | | | |
|---|---|---|---|---|
| 5,144,622 A | * | 9/1992 | Takiyasu et al. | 370/401 |
| 5,416,771 A | * | 5/1995 | Iwata | 370/410 |
| 5,479,401 A | * | 12/1995 | Bitz et al. | 370/397 |
| 5,689,512 A | * | 11/1997 | Bitz et al. | 370/395 |
| 5,694,463 A | | 12/1997 | Christie et al. | |
| 5,781,529 A | * | 7/1998 | Liang et al. | 370/218 |
| 5,872,783 A | * | 2/1999 | Chin | 370/392 |
| 6,101,188 A | * | 8/2000 | Sekine et al. | 370/401 |
| 6,151,297 A | * | 11/2000 | Congdon et al. | 370/216 |

FOREIGN PATENT DOCUMENTS

| WO | 97/05774 | 10/1997 | ............ H04Q/3/00 |
|---|---|---|---|
| WO | 98/27867 | 7/1999 | ............ H04Q/3/00 |

OTHER PUBLICATIONS

Fujioka, "Universal Service Creation and Provision Environment for Intelligent Network," 2460 IEEE Communications Magazine, 29(1991) Jan., No. 1, New York, US.

* cited by examiner

Primary Examiner—Kwang B. Yao
(74) Attorney, Agent, or Firm—Cesari & McKenna LLP

(57) ABSTRACT

The principle object of the present invention, is to provide flexibility in the routing functions performed in the switching system. Another object is to provide a router that can be centralized in a host computer or distributed among various switching nodes. The router is easily programmable by the system operator to provide different routing algorithms for various calls. The router can be used in a system with a single switching node. However, it is particularly adopted for use in a multiple-switching-node system, either as a central, host resident unit, or as a distributed router resident on the switching nodes. A router embodying the invention uses router tables that are readily configurable by the system operator to route calls based on predefined routing criterion in the incoming or outgoing call.

15 Claims, 6 Drawing Sheets

ROUTING TABLE 201

| ROUTE No 202 | ROUTE PROPERTY 204 | ROUTE GROUP 206 | CRITERIA TYPE 208 | CRITERIA DATA LENGTH 210 | CRITERIA DATA 212 | MASK 214 | TLV COUNT 216 | TLV DATA 218 |
|---|---|---|---|---|---|---|---|---|
| 1 | 1 | 2 | 61 | 14 | 8.6.2.3.3.2.7 | 255.255.255.255.255.255.255 | 1 | 15 01 101 |
| 2 | 1 | 1 | 61 | 14 | 8.6.2.3.0.0.0 | 255.255.255.255.0.0.0 | 3 | 19 01 03<br>15 01 101<br>15 01 110 |
| 3 | 1 | 3 | 64 | 8 | 9.0.19.0 | **** | 2 | 15 01 110<br>15 01 112 |
| 4 | 1 | 3 | 64 | 8 | 19.0.9.0 | **** | 2 | 15 01 111<br>15 01 113 |
| 5 | 1 | 5 | 61 | 20 | 5.0.8.0.0.0.0.0.0.0 | 255.255.255 0.0.0.0.0.0.0 | 4 | 19 01 03<br>19 01 04<br>19 01 02<br>15 01 107 |
| 6 | 1 | 4 | 67 | 2 | 10 | * | 1 | 15 01 106 |
| ... | | | | | | | | |
| X | | | | | | | | |

ROUTER STATE MACHINE 203

ROUTER - 200

| ROUTE No 202 | ROUTE PROPERTY 204 | ROUTE GROUP 206 | CRITERIA TYPE 208 | CRITERIA DATA LENGTH 210 | CRITERIA DATA 212 | MASK 214 | TLV COUNT 216 | TLV DATA 218 |
|---|---|---|---|---|---|---|---|---|
| 1 | 1 | 2 | 61 | 14 | 8.6.2.3.3.2.7 | 255.255.255. 255.255.255. 255 | 1 | 15 01 101 |
| 2 | 1 | 1 | 61 | 14 | 8.6.2.3.0.0.0 | 255.255.255. 255.0.0.0 | 3 | 19 01 03<br>15 01 101<br>15 01 110 |
| 3 | 1 | 3 | 64 | 8 | 9.0.19.0 | **** | 2 | 15 01 110<br>15 01 112 |
| 4 | 1 | 3 | 64 | 8 | 19.0.9.0 | **** | 2 | 15 01 111<br>15 01 113 |
| 5 | 1 | 5 | 61 | 20 | 5.0.8.0.0.0.0. 0.0 | 255.255.255 0.0.0.0.0.0 | 4 | 19 01 03<br>19 01 04<br>19 01 02<br>15 01 107 |
| 6 | 1 | 4 | 67 | 2 | 10 | * | 1 | 15 01 106 |
| ... | | | | | | | | |
| X | | | | | | | | |

ROUTING TABLE 201

ROUTER STATE MACHINE 203

ROUTER - 200

FIG. 2

| CRITERIA TAG 302 | CRITERIA TYPE 304 |
|---|---|
| 61 | CALLED PARTY NUMBER |
| 62 | ANI DIGITS |
| 63 | CALL CATEGORY |
| 64 | TIME OF DAY |
| 65 | INCOMING CHANNEL OR SPAN |
| 66 | LEAST COST ROUTE |
| 67 | FASTEST GROUP |
|  | . . . |

FIG. 3

| TAG 402 | LENGTH 404 | DATA 406 |
|---|---|---|
| 15 | 01 | 101 |
| 19 | 01 | 03 |

FIG. 4

| CRITERIA TAG 502 | CRITERIA TYPE 504 |
|---|---|
| 0 x 15 | RESOURCE GROUP ID |
| 0 x 09 | SPAN AND CHANNEL/NODE ADDRESS |
| 0 x 19 | ROUTE GROUP ID FOR ROUTE HUNTING |
| 0 x 11 | EMBEDDED LOGICAL DATA |
| 0 x OC | COUPLED MULTI CRITERIA |
| 0 x Od | COUPLED MULTI ROUTE GROUP ID |
|  | . . . |

FIG. 5

FLEXIBLE CALL ROUTING SYSTEM

TECHNICAL FIELD

The invention relates generally to a router for a telecommunications switching system that is easily programmable to provide different routing algorithms for various calls and is particularly adopted for use in a multiple switching node system either as a central, host resident unit, or as a distributed router resident in the switching nodes.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switching node also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards. In order to perform switching on calls, the switching node receives information from and transmits information to line card ports over the system buses at predetermined times known as time slots. Each time slot generally corresponds with a port on the switch. The time slots assigned to each port and the software applications that manage calls on those time slots are generally termed "channels."

Overall control of the system is exercised by the host, i.e., a group of software applications that typically reside on a computer. The switching nodes are interconnected by an internodal switching network. A second network termed the "host network," interconnects connects the switching nodes and the host computer for supervisory control.

The host, the switching nodes and the line cards include their own software protocol applications which instruct them on how to handle incoming calls. A Layer 5 (L5) protocol application in the host manages calls at the system level; Layer 3 (L3) protocol applications in the line cards handle calls at the line card level of the system and a Layer 4 protocol application (L4) i.e. a Central Call Processing(CPP) application in the switch, manages calls at the switch level.

In an example of a switching system to which the present invention applies the L4 application is programmable by the system operator and this enables the system operator to decide which call processing operations will be managed by the L5 applications and which operations will be managed by the L4 application. The L4 application is separated into software objects that function as state machines that are separately dedicated to specific tasks for each port in the switching node. The term "channel" thus encompasses the data paths between each port and the switch/matrix and the software objects in the switch/matrix that directly supervise the use of these paths. The primary software objects in the L4 application are a channel state machine (CH), a call management state machine (CM) and a physical connection state machine (PC). Each channel in the node includes a static instance of these primary objects. The L4 application also includes secondary software objects which include an Interworking state machine, a DSP Manager state machine, a Switch Manager state machine, a Conference Manager state machine and a Distributed Router state machine.

The CH in the L4 application is a programmable protocol language (PPL) object which manages channel state information for its associated channel. Channel state information includes information about the state of each of the other objects in the channel. The L4 CM is a PPL object which manages information about the state of any call in the associated channel. The PC is a software object which manages PCM switch connection information for its channel. The PC maintains information on whether a channel has a voice path connection active with another channel.

The Interworking State Machine helps to support internal information routing and it gives the user the capability to specify the call model on a channel by channel basis. An instance of the Interworking object is dynamically created as it is needed for each channel. The DSP Manager state machine allocates DSP resources, routes DSP requests to the appropriate DSPs and reports the results to the CH. The Switch Manager state machine and its data structures also manage simple connect and disconnect requests from the PC for all switching types, including local time slot switching and ring switching. The Conference Manager State Machine manages conference calls by managing the DSP resources and issuing commands to the DSP resources. The conference manager also manages channel connections to the DSP. The Distributed Router state machine is an object that fields requests to route information based on a number of parameters in the message. Information routing in the switching system is an important function, especially in the use of external resources such as PSTN, long distance service, etc.

A conventional router arrangement can be used to provide the routing functions. However, since the layer 4 software is now highly flexible, in that it can be readily modified by the system operator, it is highly desirable that the operator be given similar flexibility in structuring the routing functions.

SUMMARY OF THE INVENTION

Therefore, the principle object of the present invention, is to provide flexibility in the routing functions performed in the switching system. Another object is to provide a router that can be centralized in a host computer or distributed among various switching nodes. The router is easily programmable by the system operator to provide different routing algorithms for various calls. The router can be used in a system with a single switching node. However, it is particularly adopted for use in a multiple-switching-node system, either as a central, host resident unit, or as a distributed router resident on the switching nodes. A router embodying the invention uses router tables that are readily configurable by the system operator to route calls based on predefined routing criteria in the incoming or outgoing call.

Specifically in the preferred embodiment of the invention, the routing table entries include fields that enable the operator to logically combine various parameter values to determine how each call is to be routed. Calls may be routed based on the incoming port, a resource group (group of channels that connect to the same external service), an identifier of the calling or called party, the time of day or other desired criteria. Each entry in the routing table includes a field containing a route group ID, which is a key for routes having certain common criteria, a field containing a system-operator-selected, predefined criteria such as called party number; and a logic field that contains an identification of a call-termination channel group and/or a specification of a logical combination of other entries in the routing table. The field values in each entry maybe entered by the system operator through a conventional software tool with display screens. The field values maybe compiled into application programming interface (API) messages and downloaded into the router. Alternatively, the router may interpret the entries without prior compilation. Thereafter, when the CH receives a request to route a call from a line card port, the CH through the CM provides the router with routing criteria for the call and the router uses the compiled routing table to determine how to process the call.

BRIEF DESCRIPTION OF THE DRAWINGS

The invention description below refers to the accompanying drawings, of which:

FIG. 2 is a diagram of the router and the routing table used by the router;

FIG. 3 is a diagram of the typical route criteria types used in the routing table;

FIG. 4 is a diagram of the logical data field in the routing table;

FIG. 5 illustrates some of the logical tags that may be included in a logical data field in the routing table;

DETAILED DESCRIPTION OF AN ILLUSTRATIVE EMBODIMENT

Figure 1:
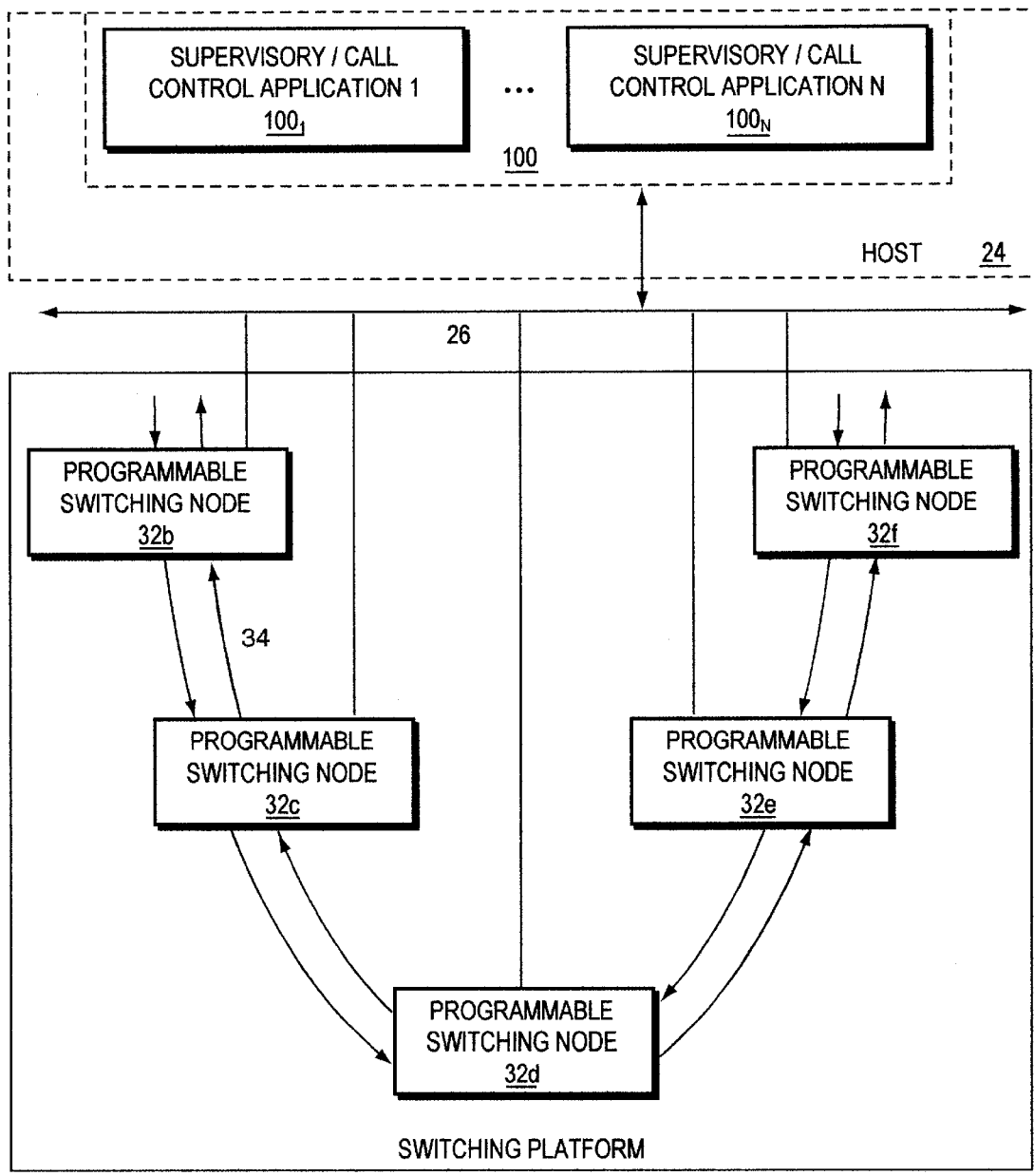
FIG. 1 is a diagram of a call switching system incorporating the invention.

FIG. 1 is a diagram of a communications network that is configured to process calls to, from and within a switching platform in accordance with the present invention. The switching platform includes switching nodes 32b–32f that are connected by a ring-like internodal switching network 34 to pass among them the various messages handled by the switching platform. Each switching node is associated with a plurality of network/line interfaces (not shown) which provide connections between the switching system and subscribers' lines, for example, and also with other switching systems such as the PSTN. These interfaces also provide access to system resources such as DSP resources and voice mail functions. The communications network also includes a host computer 24 that runs host supervisory applications $100_1$–$100_N$. The supervisory applications $100_1$–$100_N$ provide overall supervision, i.e. control and monitoring, of the switching functions of the network. The host computer 24 is linked to the switching nodes 32b–32f by a host network 26.

Host computer 24, switching nodes 23b–23f and the line cards (not shown) include their own software protocol applications which handle calls in their respective layers. A layer 5 application in the host 24 manages calls at the host level, a Layer 4 application in the switching node 32b–32f handles call-management functions in the switching node and Layer 3 applications in the line cards manage calls at the line card level. In the present invention, the Layer 4 application has been expanded to include a router 200. The router 200 contains a state machine 203 that retrieves information from a routing table 201 in determining how to route each call.

The preferred illustrative routing table 201 is shown in FIG. 2. Each entry includes a route number field 202, a route property field 204, a route group ID field 206, a criterion type field 208, a criterion data length field 210, a criterion data field 212 plus a mask field 214 when applicable, a logical data count 216 and a logical data field 218. The route number field 202 is an index into the route table; the route property field 204 is a route type mask or route type range; the route group ID field 206 is a key for routes having certain common criteria; the criterion type field 208 and the criterion data length field 210 describe the data contained in the criteria data field 212 and the mask field 214; the criteria data field 212 and the mask field 214, when applicable, are used to match the entry in the table to information received from the call-originating channel; the logical data count field 216 specifies the number of logical data entries in the logical data field 218 and the logical data field 218 defines the routing logic for the call and may also contain identification of the destination channel.

Typical route criteria types 304 are defined in FIG. 3. They include the time of day; the incoming-channel identity; a resource group identifier; an identifier of the calling or called party; a least-cost route criterion; a fastest-route criterion; and other desired criteria. Each criterion type 304 is assigned a criterion tag 302. These tags 302 are the entries in the criterion type field 208.

FIG. 4 illustrates the data in the logical data field 218 entries. Each logical data field 218 contains one or more sets of logical data. The logical data count field 216 indicates the number of data sets in the field 218. Each logical data set 218 has three parts. The first part is a logical tag 402 which identifies the kind of data in the logical data set. The second part 404 indicates the length of the data and the third part 406 is the data itself. FIG. 5 illustrates some of the logical tags 502 that may be included in a logical data entry 218. They include a resource group identifier, a span and channel or node address, a route group number that contains one of the valid route group identifiers, embedded logical data, coupled multi-criteria where subsequent route entries are coupled to one route entry, and a coupled multi-route group identifier where additional route group identifiers are coupled to one route group identifier.

FIG. 2 is an example of the use of the routing table 201 to route a call. For example, if a call to the number 862 3592 is received in the channel from a line card port, the CH associated with that port sends the call to the router 200 through the CM. Since criterion tag sixty one is assigned to the called party criterion type, the router 200 selects all entries in the table where the value in the criterion type 208 is equal to sixty one. From these entries the router 200 selects entries one, two, and five. The router 200 then checks the criteria data 212 and mask 214 fields in the selected entries to find the most specific value that fits the called number. The numbers in the mask field 214 instruct the router on which numbers in the criterion data field 212 to consider during a search. There is a one to one relationship between the numbers in the mask field 214 and the numbers in the criterion data field 212. The router 200 considers every number in the criterion data field 212 that corresponds to the number 255 in the mask field 214 and ignores the numbers that correspond to the number zero in the mask field 214. The router 200 therefore selects entry two, since its criterion data value 212 includes the called number. Thereafter, the router 200 checks the logical data count 216 to determine how many sets logical data 218 entries it has to process. In entry two, the logical data count 216 is three. The first tag 402 in the logical data field 218 is a route group identifier 206 and the data value is three. The second and third tags 402 are resource groups identifiers 502 and the values is are 101 and 110. The router 200 next moves to the entries where the route group identifier 206 is three. The router thus selects entries three and four in the routing table. The criteria types 208 in those entries are time of day tags 302. Thus if the time of the call is between 9:00 and 19:00 hours the router 200 chooses entry three and if the time of the call is between 19:00 and 9:00 hours the router chooses entry four. If the criterion in the third entry is met, i.e., the time of day is between 9:00 and 19:00 hours, the router will examine the logical data field 218 in the entry three. This field 218 specifies resource groups 110 and 112. Group 110 is the only resource group common to both entries two and three. This group is therefore selected by the router. If the time of day meets the criterion in entry four, the router will examine the logical data field 218 in entry four. This field 218 specifies resources groups 111 and 113. Since there is no resource group common to entries two and four, the router will choose one of the resource groups for the call.

After the router 200 selects a resource group, if the router is on the host, it selects an idle channel in the resource group. If the router 200 is distributed on the switching nodes, it determines if the group is on its node. The router on each node has a map of the idle channels in each group on its node. If the group is on its node, the router selects an idle channel for the call. If the group is on another switching node, the router 200 sends a route request to the router on the other node and the router on the other node selects the idle channel. Thereafter, the router returns the address for the destination channel to the CM in the originating channel and sends a message to the CM on the idle channel. The CM then processes the call.

Figure 6:
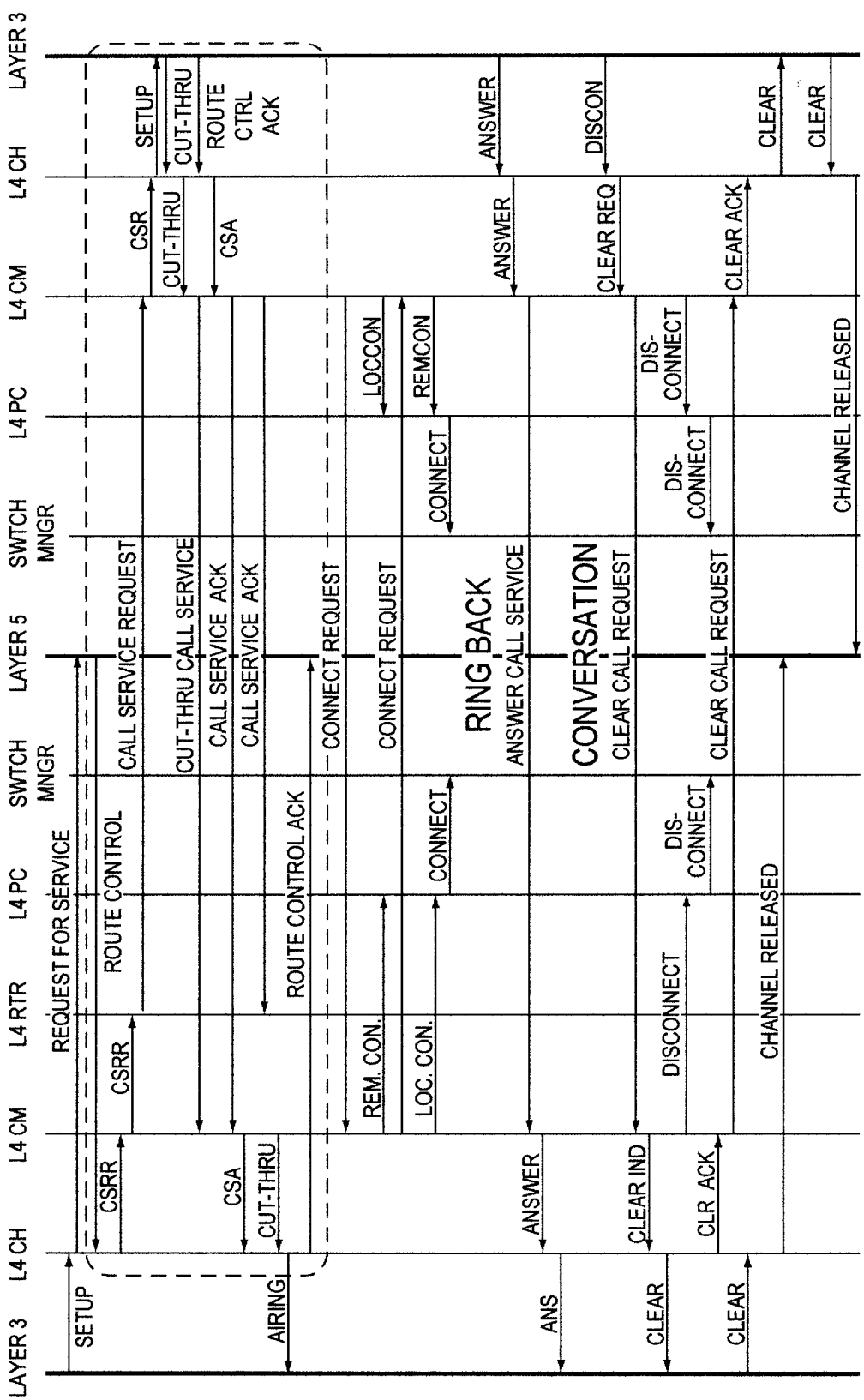
FIG. 6 is a diagram of how is a call is processed when the host originates the call by using a router to select and connect to the terminating port.

FIG. 6 is a diagram of how a call is processed when the router is used by the host to select a port for call termination. The host sends a route control message to the CH component in channel A. Upon receiving the route control message, the CH sends a Call Service Route Request (CSRR) to the CM and the CM sends the CSRR to the Router. From this point on, the call is processed in the same manner as an internal routing for an incoming call. This allows the host to use API messages to invoke the router and connect to the selected port.

Figure 7:
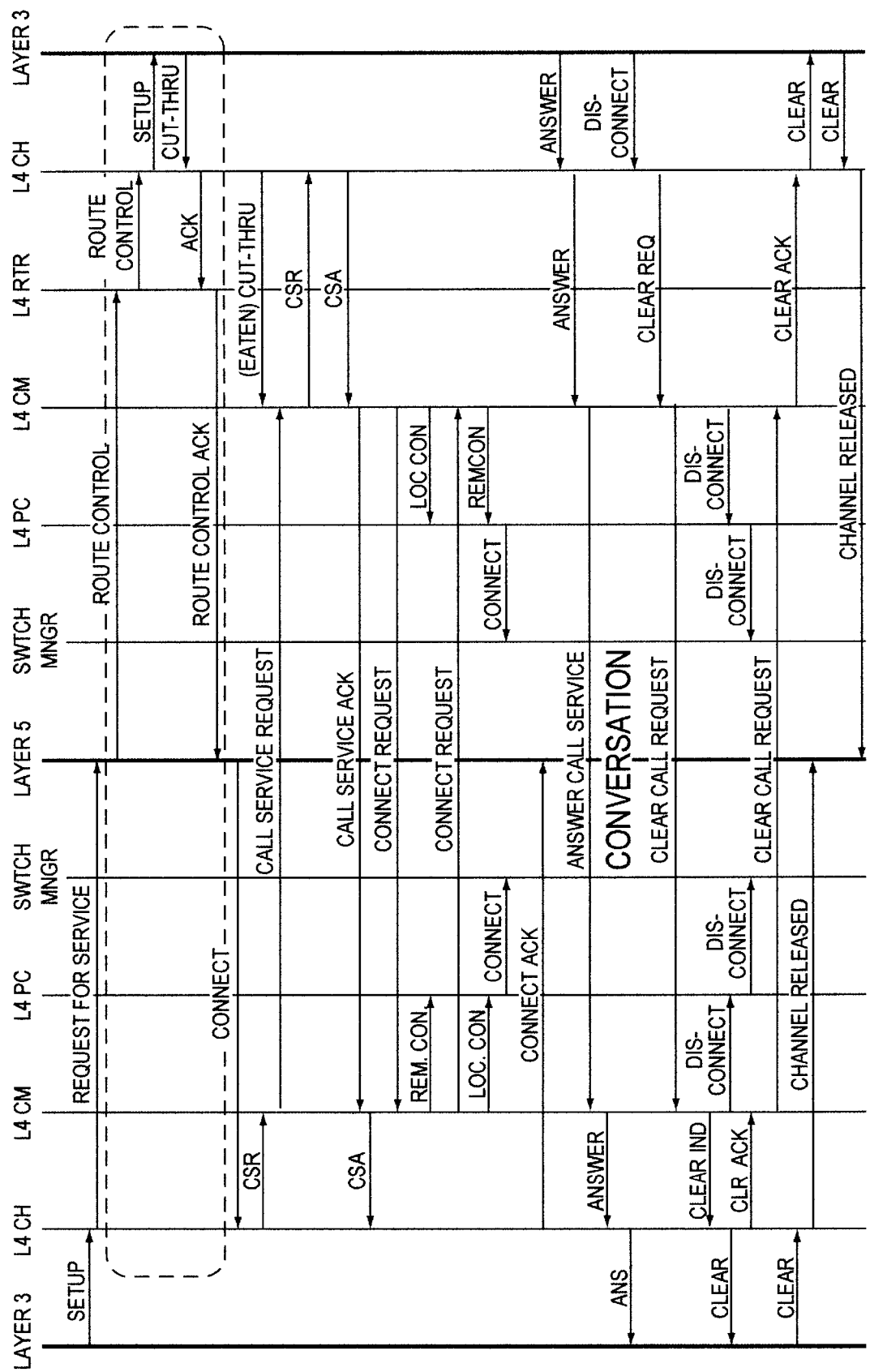
FIG. 7 is another diagram of how a call in is processed when the host originates the call using a router.

FIG. 7 is another diagram of how a call may be processed when the router is used by the host for port selection. The host sends a route control message to the router state machine. Upon receiving the route control message, the router 200 uses the routing table 201 to parse the message and the router 200 derives a route, i.e., selects a channel, based on the passed parameters. If there is a successful route, the router will send the route control message to the selected channel's CH. The remote/selected CH component will send a setup-network message to the layer 3 interface. The message includes a bit that tells the L3 application to direct its response to the switching node rather than to the host. Upon receiving a response from the L3 interface, the remote CH passes the response to the router. The router then acknowledges the route control message to the host by indicating which channel, i.e., span or channel address has been selected.

Figure 8:
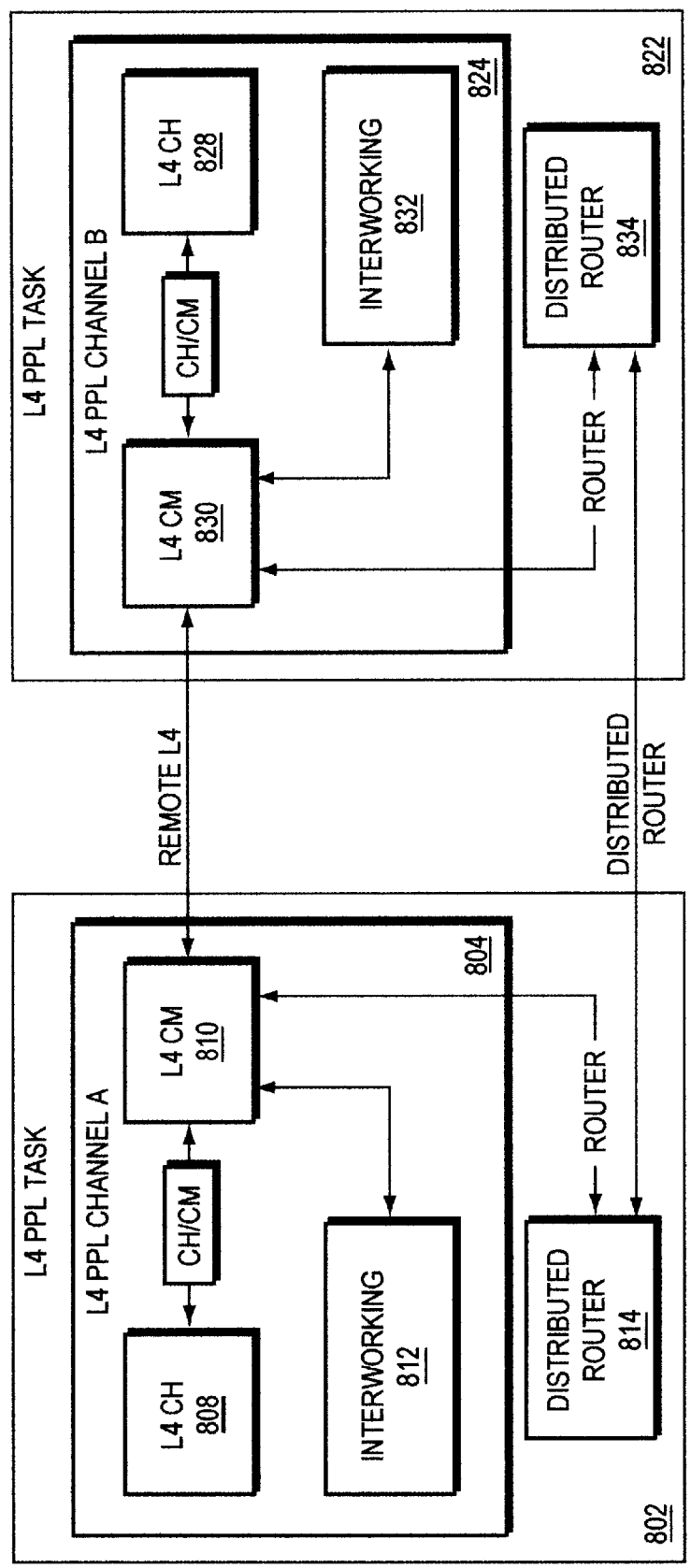
FIG. 8 shows how a call is processed in a distributed router in the switching nodes.

FIG. 8 shows how a call is processed in a distributed router in the switching nodes. The distributed router in the originating channel, channel A, accepts a call service route request from the originating CH through the CM. The router attempts to find a route based on information in the route table 201. If a route is found in node, the router sends messages to the destination channel's CM and to the originating channel's CM. However, if a route is found on another node, the router on channel A sends a request to a router on a remote channel, channel B. If the remote router finds the route of its channel, the remote router sends a message to the remote CM component. If a route cannot be found, or if the remote channel's CM component rejects the request, a rejection message is returned to the original channel's CM component.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communications network comprising:
   (A) a plurality of switching nodes each of which contains line cards with multiple ports for connections between the communications network and subscriber lines or other switching systems, and objects for processing calls on channels associated with each port;
   (B) an internal network interconnecting the switching nodes for conveying switched telecommunications data between them;
   (C) a host computer that includes software applications which exercise supervisory control over the nodes;
   (D) a host network linking the host computer with the switching nodes;
   (E) a programmable router that utilizes a configurable routing table to route calls based on predefined routing criteria, said routing table including multiple entries each having multiple fields, a first field in each entry specifying one of a set of routing criteria, a second field in each entry specifying a group of ports to which a call may be routed and/or one or more of the other entries whose first fields are examined to determine whether call parameters match the criteria in those fields, and a field containing a route group identifier for indentifying entries having certain common criteria, and wherein said entries in said router table also include:
      (i) a route number field for indexing the routing table;
      (ii) a route property field for identifying a route type mask or range;
      (iii) the first field which is a criterion type field for specifying one of a set of routing criteria types;
      (iv) a criterion data length field for storing the length of routing criteria data and mask;
      (v) a routing criteria data field for storing predefined routing criteria data;
      (vi) a criterion data mask field for specifying which digits in the routing criteria data field to consider when routing a call;
      (vii) a logical data count field for specifying the number of sets of logical data in the logical data field; and
      (viii) the second field which is a logical data field for storing sets of logical data which identify a call-termination channel group, said logical data field may also specify other entries in the routing table; and
   (F) means for logically combining values in routing table fields based on the results obtained by examining the other entries identified by the second field.

2. The communications network of claim 1 wherein the router may be centralized on the host computer or distributed among various switching nodes.

3. The communications network of claim 1 wherein each criterion type is assigned a criterion tag, the criterion tag is placed in the criterion type field in each entry with the matching criterion data.

4. The communications network of claim 3 wherein each logical data field comprises one or more sets of logical data and each logical data set comprises:
   A) a logical tag which identifies the kind of data in the logical data set;
   B) the length of the logical data in the set; and
   C) the logical data itself.

5. The communications network of claim 4 wherein the router on the host selects an idle channel based on the call-termination channel group identified by the logical data field.

6. The communications network of claim 4 wherein the router on a switching node has a map of idle channels in each call-termination channel group on that node and selects an idle channel in the call-termination channel group.

7. The communications network of claim 6 wherein the router sends a route request to a router on another switching node if the call-termination channel group identified by the logical data field is on the other switching node and the router on the other switching node selects an idle channel in the call-termination channel group on that other switching node.

8. The communications network of claim 7 wherein the router returns the address for the destination channel to an object in a originating channel for the call and sends a message to an object in the idle channel.

9. A switching node which comprises:
   (A) line cards wit multiple ports for connections between switching node and subscriber lines or other switching systems;
   (B) objects for processing call on channels associated with each port;
   (C) a programmable router that utilizes a configurable routing table to route calls based on predefined routing criteria, said routing table including multiple entries each having multiple fields, a first field in each entry specifying one of a set of routing criteria, a second field in each entry specifying a group of ports to which a call may be routed and/or one or more of the other entries whose first fields are examined to determine whether call parameters match the criteria in those field, and wherein said entries in said router table also include:
      (i) a route number field for indexing the routing table;
      (ii) a route property field for identifying a route type mask or range;
      (iii) the first field which is a criterion type field for specifying one of a set of routing criteria types;
      (iv) a criterion data length field for storing the length of routing criteria data and mask;
      (v) a routing criteria data field for storing predefined routing criteria data;
      (vi) a Criterion data mask field for specifying which digits in the routing criteria data field to consider when routing a call;
      (vii) a logical data count field for specifying the number of sets of logical data in the logical data field; and
      (viii) the second field which is a logical data field for storing sets of logical data which identify a call-termination channel group, said logical data field may also specify other entries in the routing table; and s;
   (D) means for logically combining values in routing table fields based on the results obtained by examining the other entries identified by the second field.

10. The switching node of claim 9 wherein each criterion type is assigned a criterion tag, the criterion tag is placed in the criterion type field in each entry with the matching criterion data.

11. The switching node of claim 10 wherein each logical data field comprises one or more sets of logical data and each logical data set comprises:
    A) a logical tag which identifies the kind of data in the logical data set;
    B) the length of the logical data in the set; and
    C) the logical data itself.

12. The switching node of claim 11 wherein the router has a map of idle channels in each call-termination channel group and the router selects an idle channel in the call-termination channel group.

13. The switching node of claim 12 wherein the router sends a route request to a router on another switching node if the call-termination channel group identified by the logical data field is on the other switching node and the router on the other switching node selects an idle channel in the call-termination channel group on that other switching node.

14. The switching node of claim 13 wherein the router returns the address for the destination channel to an object in a originating channel for the call and sends a message to an object in the idle channel.

15. A method for routing calls in a communications network, the network comprising at least one switching node, said switching node comprising (a) line cards with multiple ports each of which has an associated channel and (b) a router that utilizes a configurable routing table to route calls based on predefined routing criteria, said routing table including multiple entries each having multiple fields, a first field in each entry specifying one of a set of routing criteria, a second field in eavh entry specifying a group of ports to which a call may be routed and/or one or more of the other entries whose first fields are examined to determine whether call parameters match the criteria in those fields, said method comprising the steps of:
   (A) receiving incoming data in the channel from the associated line card port;
   (B) sending the incoming data to the router;
   (C) selecting each entry in the routing table to specifying:
      (i) a route number field for indexing the routing table;
      (ii) a route property field for identifying a route type mask or range;
      (iii) a criterion type field for specifying one of a set of routing criteria types;
      (iv) a criterion data length field for storing the length of routing criteria data and mask;
      (v) a routing criteria data field for storing predefined routing criteria data;
      (vi) a criterion data mask field for specifying which digits in the routing criteria data field to consider when routing a call;
      (vii) a logical data field for storing sets of logical data which identify a call-termination channel group, said logical data field may also specify other entries in the routing table where a criterion tag is associated with criterion type in the incoming data;
   (D) checking a criteria data field and a mask field in the selected entries to find the most specific value that fits the criterion data in the incoming data;
   (E) selecting the entry that best matches the criterion data and checking a logic data count field to determine the number of logical data sets in a logical data field; and
   (F) checking a tag in each logical data set determine the group of ports to which a call may be routed and/or one or more of the other entries whose first fields are examined to determine whether call parameters match the criteria in those fields.

* * * * *